United States Patent
Loewe et al.

(10) Patent No.: US 8,387,377 B2
(45) Date of Patent: Mar. 5, 2013

(54) HYDROSTATIC MULTI-MOTOR DRIVE

(75) Inventors: Peter Loewe, Rot (DE); Heinz-Gerhard Essig, Lonsee (DE)

(73) Assignee: Robert Bosch GmbH, Stuttgart (DE)

( * ) Notice: Subject to any disclaimer, the term of this patent is extended or adjusted under 35 U.S.C. 154(b) by 933 days.

(21) Appl. No.: 12/519,240

(22) PCT Filed: Dec. 12, 2007

(86) PCT No.: PCT/EP2007/010911
§ 371 (c)(1), (2), (4) Date: Jun. 15, 2009

(87) PCT Pub. No.: WO2008/071420
PCT Pub. Date: Jun. 19, 2008

(65) Prior Publication Data
US 2010/0043422 A1    Feb. 25, 2010

(30) Foreign Application Priority Data
Dec. 13, 2006 (DE) .......... 10 2006 058 802

(51) Int. Cl.
*F16H 61/40* (2010.01)
*B60K 17/10* (2006.01)
(52) U.S. Cl. .......... 60/424; 180/308
(58) Field of Classification Search .......... 60/424, 60/468, 484; 180/308
See application file for complete search history.

(56) References Cited

U.S. PATENT DOCUMENTS

| | | | |
|---|---|---|---|
| 4,649,706 A * | 3/1987 | Hutson | 60/424 |
| 6,508,328 B1 | 1/2003 | Kenyon et al. | |
| 6,675,575 B1 * | 1/2004 | Cunningham | 60/468 |
| 6,991,058 B2 * | 1/2006 | Cousin et al. | 180/307 |
| 2004/0040774 A1* | 3/2004 | Feldcamp | 180/308 |

FOREIGN PATENT DOCUMENTS

| | | |
|---|---|---|
| EP | 1 125 782 A1 | 8/2001 |
| EP | 1 837 226 A2 | 9/2007 |
| FR | 2 709 454 | 3/1995 |
| GB | 1019593 | 2/1966 |

* cited by examiner

*Primary Examiner* — Thomas E Lazo
(74) *Attorney, Agent, or Firm* — Scully, Scott, Murphy & Presser. P.C.

(57) ABSTRACT

The invention relates to a hydrostatic multi-motor drive (1) with a hydraulic pump (2) and at least one first pair of hydraulic motors. The two hydraulic motors (6, 7) of the first pair of hydraulic motors are connected to one another in series by means of a first working line section (12). A bypass line (15) is provided which connects a first connection (11; 10) of the hydraulic motor (7; 6), which is upstream in relation to a volumetric flow generated by the hydraulic pump (2), to a second connection (9; 8) of the downstream hydraulic motor (7; 6). A first valve unit (18) which interrupts the first bypass line (15) is arranged in the bypass line (15). A first minimum pressure maintaining device (25; 26) for maintaining a minimum pressure at the upstream connection (11; 10) of the downstream hydraulic motor (7; 6) is also arranged in the bypass line (15).

14 Claims, 6 Drawing Sheets

HYDROSTATIC MULTI-MOTOR DRIVE

BACKGROUND

The invention relates to a hydrostatic multi-motor drive.

A hydrostatic multi-motor drive is known from FR 2 709 454 A. The hydrostatic multi-motor drive comprises a total of four adjustable hydraulic motors. To subject the hydraulic motors to pressure medium, a hydraulic pump connected to a driving engine is provided. Depending on the direction of travel, the likewise adjustable hydraulic pump delivers to a first and a second working line. In order to synchronise the hydraulic motors with one another in pairs, the hydraulic motors are connected to one another in series in pairs. A first hydraulic motor pair is connected to one another via a first working line section. Likewise, the second hydraulic motor pair is connected to one another via a second working line section. When there is a flow through in each case both hydraulic motors of a hydraulic motor pair, the two hydraulic motors of the hydraulic motor pair are synchronised with one another, since a constant volume flow flows through both hydraulic motors.

In order to improve the efficiency during normal driving, where, for example, only one hydraulic motor of each hydraulic motor pair is to be driven, there is a bypass line, by which the respectively downstream hydraulic motor of each hydraulic motor pair is bypassed. The pressure medium flowing through the respectively upstream hydraulic motor is thus led past the downstream hydraulic motor, with the result that the counterpressure for the upstream hydraulic motor falls. The efficiency of the upstream hydraulic motors thus increases. In order to be able to switch between a locked operating state and the optimised-efficiency state, a valve unit which can interrupt the bypass line is provided.

In the case of the multi-motor drive known from FR 2 709 454 A, it is a disadvantage that, owing to the simple short-circuiting of the two connections of the downstream hydraulic motor of each hydraulic motor pair, the inlet-side pressure of the downstream hydraulic motor falls practically to the suction pressure of the hydraulic pump. The respectively downstream hydraulic motor of each hydraulic motor pair therefore has to be coupled to the drive train of the vehicle, again resulting in losses. These losses have an adverse effect on the overall efficiency of the multi-motor drive.

It is therefore the object to provide a hydrostatic multi-motor drive having an improved efficiency.

SUMMARY

According to the invention, the hydrostatic multi-motor drive has a hydraulic pump and at least one first hydraulic motor pair. The two hydraulic motors of the first hydraulic motor pair are connected to one another in series via a first working line section. There is provided a first bypass line, which connects an upstream connection of the hydraulic motor to a downstream connection of the downstream hydraulic motor. A first valve unit, which interrupts the first bypass line, is arranged in the first bypass line. According to the invention, at least one first minimum-pressure maintaining device for maintaining a minimum pressure at the upstream connection of the downstream hydraulic motor is provided in the first bypass line. It is thus ensured that a non-negligible pressure is present at the upstream connection of the downstream hydraulic motor. In this case, the pressure prevailing there can be set by the minimum-pressure maintaining device. It is thus possible to set in the first working line section a lower pressure which does not lead to a significant worsening of the efficiency of the upstream motor. At the same time, however, at the inlet side of the downstream hydraulic motor, a pressure which leads to the production of a low driving torque of the downstream hydraulic motor is maintained. Thus, the downstream hydraulic motor is likewise driven and does not have to be coupled to the drive of the vehicle. Accordingly, not only is the efficiency of the upstream hydraulic motor reduced by the relief of the first working line section via the bypass line, but, moreover, losses at the downstream hydraulic motor are also avoided.

Advantageous developments of the hydrostatic multi-motor drive according to the invention are set out in the subclaims.

In particular, it is advantageous to provide at least one spring-loaded nonreturn valve in the minimum-pressure maintaining device. With the aid of such a spring-loaded nonreturn valve, it is possible in a simple manner to maintain in the first working line section a minimum pressure defined by the spring force.

Furthermore, it is advantageous that the bypass line comprises at least a first section, a second section and a third section. The first section connects the first working line section and thus both hydraulic motors to the first valve unit at their mutually facing connections. The second section connects the first valve unit to a downstream working line, and the first sections connects the valve unit to the upstream working line. A symmetry of the hydrostatic multi-motor drive by which the hydrostatic multi-motor drive can be used in the same way for both flow directions is thus achieved. Even on a reversal of the flow direction through the two hydraulic motors of the first hydraulic motor pair, a bypassing of the then downstream hydraulic motor is therefore possible. In this case, it is preferred for there to be arranged in the second section and in the third section in each case one spring-loaded nonreturn valve.

In particular, it is preferred that the hydrostatic multi-motor drive comprises a second hydraulic motor pair. The two hydraulic motors of the second hydraulic motor pair are likewise connected to one another in series via a second working line section. To bypass the downstream hydraulic motor of the second hydraulic motor pair, there is provided a second bypass line, which can likewise be disconnected by a second valve unit. Furthermore, at least one second minimum-pressure maintaining device is assigned in the second bypass line. With such a multi-motor drive which has two hydraulic motor pairs, an all-wheel-driven travel drive can be realised in a simple manner.

The first and the second bypass line as well as the corresponding minimum-maintaining pressure devices and the valve unit are in this case preferably identically constructed. By the assignment of in each case one valve unit and in each case one bypass line and a minimum-pressure maintaining device arranged therein to each hydraulic motor pair, a simple arrangement of the lines is ensured.

According to a further preferred embodiment, the hydrostatic drive comprises a second hydraulic motor pair, the two hydraulic motors of which are connected to one another in series via a second working line section. The respectively downstream hydraulic motors of the two hydraulic motor pairs in this case use a common first bypass line, so that merely one valve unit is required for interrupting the first bypass line. The first bypass line connects the respectively upstream connections of the downstream hydraulic motors of both hydraulic motor pairs to the downstream connections of the downstream hydraulic motors of both hydraulic motor pairs.

In this case, it is in particular preferred to divide a first section of the first bypass line into a first bypass line branch into a second bypass line branch. The first bypass line branch connects the first working line section to the valve unit. In contrast, the second bypass line branch connects the second working line section to the first valve unit. In particular, the first bypass line branch and the second bypass line branch lead to a common connection of the first valve unit.

In contrast, according to a further preferred embodiment, the first bypass line branch and the second bypass line branch lead to two different connections of the valve unit. These two connections of the first valve unit are disconnected from one another in one switching position of the first valve unit. During synchronised driving, there is thus no through-flow connection from the first working line section to the second working line section. Thus, the two hydraulic motors of the first hydraulic motor pair and the two hydraulic motors of the second hydraulic motor pair are then synchronised with one another in pairs, but independent of the hydraulic motors of the other hydraulic motor pair respectively.

The first working line section and the second working line section preferably have in each case a separate feed valve unit, via which the working line sections are connected to a feed device.

Also when using two hydraulic motor pairs, the minimum-pressure maintaining device preferably comprises in each case one spring-loaded nonreturn valve in the second section and in the third section of the bypass line. Thus, also when using a total of four hydraulic motors, the possibility is provided, irrespective of the direction of travel, of operating in each case only one hydraulic motor of a hydraulic motor pair with a high driving torque and, by driving the second hydraulic motor of each hydraulic motor pair with a low torque, of reducing the overall losses of the hydrostatic multi-motor drive.

The valve unit in the first and/or in the second bypass line is preferably embodied as a switching valve, in which case at least in one switching position of the switching valve the working line section connecting the two hydraulic motors to one another is connected to a feed device.

BRIEF DESCRIPTION OF THE DRAWINGS

Preferred exemplary embodiments of the hydrostatic multi-motor drive according to the invention are illustrated in the drawing and explained in more detail in the following description. In the drawing.

DETAILED DESCRIPTION OF EXEMPLARY EMBODIMENTS

Figure 1:
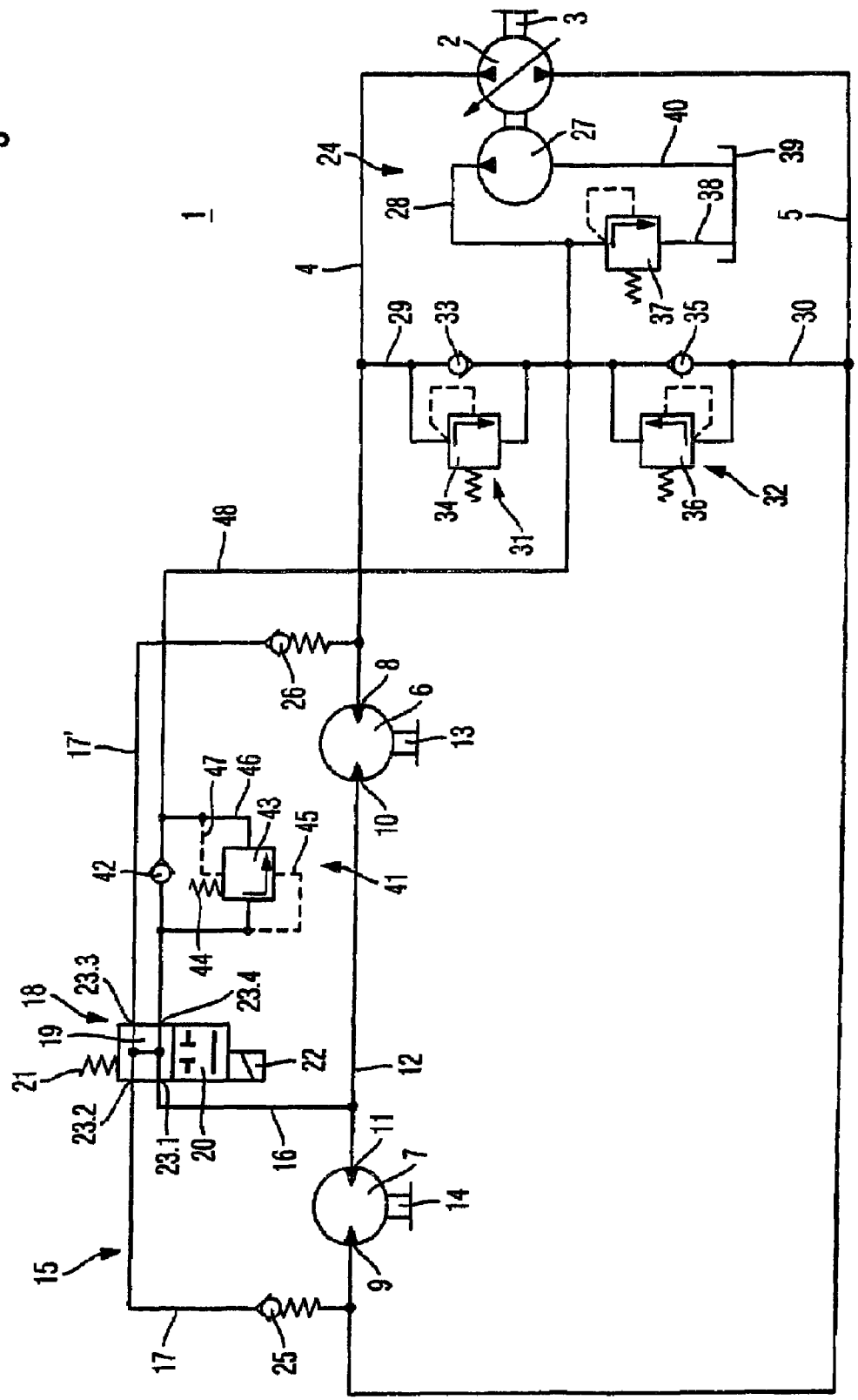
FIG. 1 shows a first exemplary embodiment of a hydrostatic multi-motor drive according to the invention having one hydraulic motor pair.

Illustrated in FIG. 1 is a hydraulic circuit diagram of a hydrostatic multi-motor drive 1 according to the invention.

The hydrostatic multi-motor drive 1 comprises an adjustable hydraulic pump 2. The adjustable hydraulic pump 2 is driven by a driving engine (not illustrated) via a driving shaft 3. The driving engine (not illustrated) is usually embodied as an internal combustion engine.

The hydraulic pump 2, for example an axial piston machine of swashplate design, delivers to a first working line 4 or to a second working line 5, depending on the set delivery volume and the delivery direction. The hydrostatic drive 1 illustrated is preferably a travel drive for a hydrostatically driven commercial vehicle. The hydrostatic multi-motor drive comprises a first hydraulic motor 6 and a second hydraulic motor 7. The first hydraulic motor 6 is connected to the first working line 4 by a first connection 8. The second hydraulic motor 7 is connected to the second working line 5 by a first connection 9 of the second hydraulic motor 7. The two hydraulic motors 6, 7 each have a second connection 10, 11, these two second connections 10, 11 of the first hydraulic motor 6 and of the second hydraulic motor 7 being connected to one another via a first working line section 12.

In the exemplary embodiment illustrated, the two hydraulic motors 6, 7, which form a first hydraulic motor pair, are embodied as fixed displacement motors. Owing to the serial arrangement, in which the first hydraulic motor 6 is connected to the second hydraulic motor 7 via the first working line section 12, a synchronous running of the two hydraulic motors 6, 7 is achieved. The synchronisation of the two hydraulic motors 6, 7 is achieved by the volume flow identity in the first hydraulic motor 6 and in the second hydraulic motor 7.

The torque produced by the two hydraulic motors 6, 7 is led off, for example, to a driven vehicle axle via the output shaft 13 of the first hydraulic motor 6 or via the output shaft 14 of the second hydraulic motor 7.

For the following statements, it is assumed that the hydraulic pump 2 is set in its delivery volume and its delivery direction in such a way that it delivers to the first working line 4. Accordingly, the first hydraulic motor 6 of the first hydraulic motor pair becomes the upstream hydraulic motor. Accordingly, the second hydraulic motor 7 of the first hydraulic motor pair is the downstream hydraulic motor in relation to the flow direction, as is predetermined by the delivery direction of the hydraulic pump 2. It is obvious that on reversal of the flow direction (e.g. on rearward travel), the terms "upstream" and "downstream" in relation to the connections and hydraulic motors must be interchanged.

The synchronous running of the two hydraulic motors 6, 7 is achieved when the two hydraulic motors 6, 7 are arranged in series with respect to one another and the pressure medium delivered by the hydraulic pump 2 flows through both hydraulic motors 6, 7. This can be used, for example, for a locked all-wheel drive. In order to keep the losses arising at the upstream first hydraulic motor 6 low, it is, however, desirable to reduce the counterpressure. The counterpressure is that pressure which prevails on the downstream side of the first, upstream hydraulic motor 6. The pressure prevailing in the first working line section 12 must therefore be kept as low as possible to reduce the losses. A first bypass line 15 is provided for this purpose. The first bypass line 15 comprises a first section 16, a second section 17 and a third section 17'. The first section 16 is connected to the first working line section 12 at a first end. The second section 17 is connected to the second working line 5 and thus, for the above-described flow direction, to the downstream first connection 9 of the second hydraulic motor 7. The third section 17' is connected to the first working line 4 by a first end and thus to the upstream first connection 8 of the first hydraulic motor 6. In the first bypass line 15 there is provided a first valve unit, by which the connection between the first section 16 and the third and fourth section 17, 17' can be interrupted. The first valve unit is embodied as a first switching valve 18. The first switching valve 18 is a 4/2-way valve. In its rest position 19, which constitutes the first switching position of the first switching valve 18, the first switching valve 18 connects the first section 16 both to the second section 17 and to the third section 17'. In contrast, in a second switching position 20, the connection between the first section 16 and the third section 17, 17' is interrupted. From its rest position, in which the first switching valve 18 is maintained by the force of a valve spring 21, the first switching valve 18 can be moved to its second switching position 20 by subjecting an electromagnet 22, which acts counter to the force of the spring 21, to a control signal. Instead of the electromagnet 22 illustrated in FIG. 1, other actuators may also be used. In particular, a control pressure surface, for example, can be subjected to a hydraulic force.

The first switching valve 18 has a first connection 23.1, a second connection 23.2, a third connection 23.3 and a fourth connection 23.4. The first connection 23.1 is connected to the first section 16. The second section 23.2 is connected to the second section 17. The third connection 23.3 is connected to the third section 17'. The fourth connection 23.4 is connected to a connecting line 48 and, in the rest position 19 of the first switching valve 18, to the other connections 23.1, 23.2 and 23.3. That end of the connecting line 18 which faces away from the fourth connection 23.4 is connected to a feed device 24. The feed device 24 will be explained below.

In the second section 17 there is arranged a first spring-loaded nonreturn valve 25. The spring-loaded first nonreturn valve 25 opens in the direction of the second working line 5.

In a corresponding manner, in the third section 17' there is arranged a second spring-loaded nonreturn valve 26. The second spring-loaded nonreturn valve 26 opens in the direction of the first working line 4.

If the first switching valve 18 is in the rest position 19, illustrated in FIG. 1, the first section 17 is connected both to the third section 17' and to the second section 17 and the feed line 24. On a delivery of pressure medium by the hydrostatic pump 2 to the first working line 4, the pressure medium flows firstly through the first hydraulic motor 6. The second spring-loaded nonreturn valve 26 is in its closed position on account of the arising pressure difference between the upstream side of the first hydraulic motor 6 and the downstream side of the first hydraulic motor 6. The pressure medium supplied to the first hydraulic motor 6 is relieved to the first working line section 12 via the first hydraulic motor 6 while producing torque at the output shaft 13. The pressure medium is supplied to the second, downstream working line 5 via the first section 16 and the second section 17, which are connected to one another in the rest position of the switching valve 18, while bypassing the second, downstream hydraulic motor 7. With this flow direction, the first spring-loaded nonreturn valve 25 opens and enables a through-flow connection between the second section 17 and the second working line 5. Owing to the spring force of the spring of the first spring-loaded nonreturn valve 25, it is in this case possible to set from which pressure in the first working line section 12 the spring-loaded nonreturn valve 25 opens. Preferably, the first spring-loaded nonreturn valve 25 is set to an opening pressure of 10 bar. A pressure defined by the first spring-loaded nonreturn valve 25 is thus present at the upstream second connection 11 of the second, downstream hydraulic motor 7. The second, downstream hydraulic motor 7 of the first hydraulic motor pair thus experiences a low driving power and does not have to be coupled to the drive of the driven vehicle via the driving shaft 14. Consequently, by lowering the pressure prevailing in the first working line section 12, not only the efficiency of the upstream first hydraulic motor 6 is increased, but also additional losses by the downstream second hydraulic motor 7 are prevented. For the above-described flow direction, the first bypass line 15 thus connects the upstream second connection 11 of the second, downstream hydraulic motor 7 to the downstream first connection 9 of the second, downstream hydraulic motor 7.

By means of the third section 17', it is possible to produce a main driving torque by merely the upstream hydraulic motor, even on a reversal of the direction of travel and thus of the flow direction. In this case, pressure medium is delivered to the second, then upstream working line 5 by the hydraulic pump 2. The first spring-loaded nonreturn valve 25 thereupon moves to its closed position and the delivery pressure of the hydraulic pump 2 is present at the then upstream first connection 9 of the second, then upstream hydraulic pump 7. The pressure medium is relieved to the first working line section 1 via the upstream, second hydraulic motor 7 while producing an output torque. If the first switching valve 18 is in the position illustrated in FIG. 1, a pressure of 10 bar arises again in the first working line section 12 on account of the second spring-loaded nonreturn valve 26, provided that the second spring-loaded nonreturn valve 26 moves to its open position likewise at 10 bar. The pressure medium is led off to the first, then downstream working line 4 via the first section 16 and the third section 17' of the first bypass line 15. The then upstream second connection 10 of the downstream, first hydraulic motor 6 is therefore merely subjected to the low pressure of 10 bar. An improvement of the overall efficiency of the hydrostatic multi-motor drive is therefore achieved for the opposite direction of travel as well.

Instead of the fault-loaded nonreturn valves 26, 25 as the minimum-pressure maintaining device, a nonreturn valve could also be used in combination with a throttling point, for example.

The fourth connection 23.4 of the switching valve 18 is connected, as has already been explained, to the feed device 24 of the multi-motor drive 1 via the connecting line 48. The feed device 24 comprises a feed pump 27, embodied as a fixed displacement pump. The feed pump 27 delivers pressure medium to a feed pressure line 28. The feed pump 27 and the hydraulic pump 2 are preferably driven by the same driving engine and via the same drive shaft 3. The feed pressure line 28 is connected, via a first feed line 29 and via a second feed line 30, to the first working line 4 and to the second working line 5, respectively. A first feed valve unit 31 is provided in the first feed line 29. The first feed valve unit 31 comprises a nonreturn valve 33 arranged in the first feed line 29. The nonreturn valve 33 opens in the direction of the first working line 4. Provided parallel to the nonreturn valve 33 is a first high-pressure limiting valve 34.

The first high-pressure limiting valve 34 is arranged parallel to the nonreturn valve 33 and relieves the first working line 4 in the direction of the feed pressure line 28 if the pressure in the first working line 4 exceeds a critical value.

In a corresponding manner, a second feed valve unit 32 is provided in the second feed line 30. The second feed valve unit 32 comprises a second nonreturn valve 35 and a second high-pressure limiting valve 36 arranged parallel thereto. The function of the second feed valve unit 32 corresponds to the function of the first feed valve unit 31. To avoid repetitions, renewed description is dispensed with.

A third feed valve unit 41 is arranged in the connecting line 48. The third feed valve unit 41 comprises a third nonreturn valve 42. The third nonreturn valve 42 is arranged in the connecting line 48 and opens in the direction of the first switching valve 18. Provided parallel to the third nonreturn valve 42 is a differential pressure regulating valve 43. That differential pressure regulating valve 43 is maintained in a closed position by a regulating valve spring 44. A hydraulic force acts on a measuring surface of the differential pressure regulating valve 43 counter to the force of the regulating valve spring 44. The hydraulic force is produced on account of the pressure present at the fourth connection 23.4 of the first switching valve 18 and is supplied to the force measuring surface of the differential pressure regulating valve 43 via a first measuring line 45. A further hydraulic force acts on the differential pressure regulating valve 43 in the same direction as the force of the regulating valve spring 44. This further hydraulic force is produced at a further hydraulic force measuring surface, the pressure in the connecting line 48 being supplied to the further force measuring surface, upstream of the third nonreturn valve 42.

The differential pressure regulating valve 43 is arranged in a bypass line 46. The bypass line 46 connects a line section of the connecting line 48 between the third nonreturn valve 42 and the switching valve 18 to a line section of the connecting line 48 which connects the third nonreturn valve 42 to the feed pressure line 28.

For protection of the feed device 24 and for setting a feed pressure which is as constant as possible, a feed pressure limiting valve 37 is connected to the feed pressure line 28. The feed pressure limiting valve 37 is arranged in a relief line 38. The relief line 38 leads into a tank volume 39. With the aid of the feed pressure limiting valve 37, a pressure largely independent of the rotational speed of the feed pump 7, embodied as a fixed displacement pump, is maintained in the feed pressure line 28. The feed pump 27 sucks in pressure medium from the tank volume 39 via a suction line 40.

In FIG. 1 the first hydraulic motor 6 and the second hydraulic motor 7, which together form the first hydraulic motor pair, are embodied as fixed displacement motors. The fixed displacement motors are provided for delivery of pressure medium in two directions. Alternatively, the two hydraulic motors of the first hydraulic motor pair may also be designed as dual displacement motors or variable displacement motors.

By providing the minimum-pressure maintaining device in the form of spring-loaded nonreturn valves, a minimum pressure is maintained on the inlet side of the respectively downstream hydraulic motor of the hydraulic motor pair. At the same time, by way of the first bypass line 15, the pressure in the first working line section 12 is markedly reduced and the losses on account of the counterpressure at the upstream first and second hydraulic motor 6, 7 are reduced. The overall efficiency can thus be significantly improved. Such a setting is advantageous whenever a driving operation merely by one driven vehicle axle is expedient, because the traction conditions allow this, for example. The drive by merely the upstream hydraulic motor of the hydraulic motor pair will constitute the greatest proportion of the overall driving operation. The rest position 19 of the first switching valve 18 is therefore chosen in such a way that the downstream hydraulic motor 7 or 6 of the hydraulic motor pair is subjected merely to a low residual pressure. An energising of the electromagnet 22 or switching-on of the actuator in order to move the first switching valve 18 to its second switching position 20 is therefore only necessary whenever a locked drive and thus the synchronous running of the two hydraulic motors 6, 7 is required.

Figure 2:
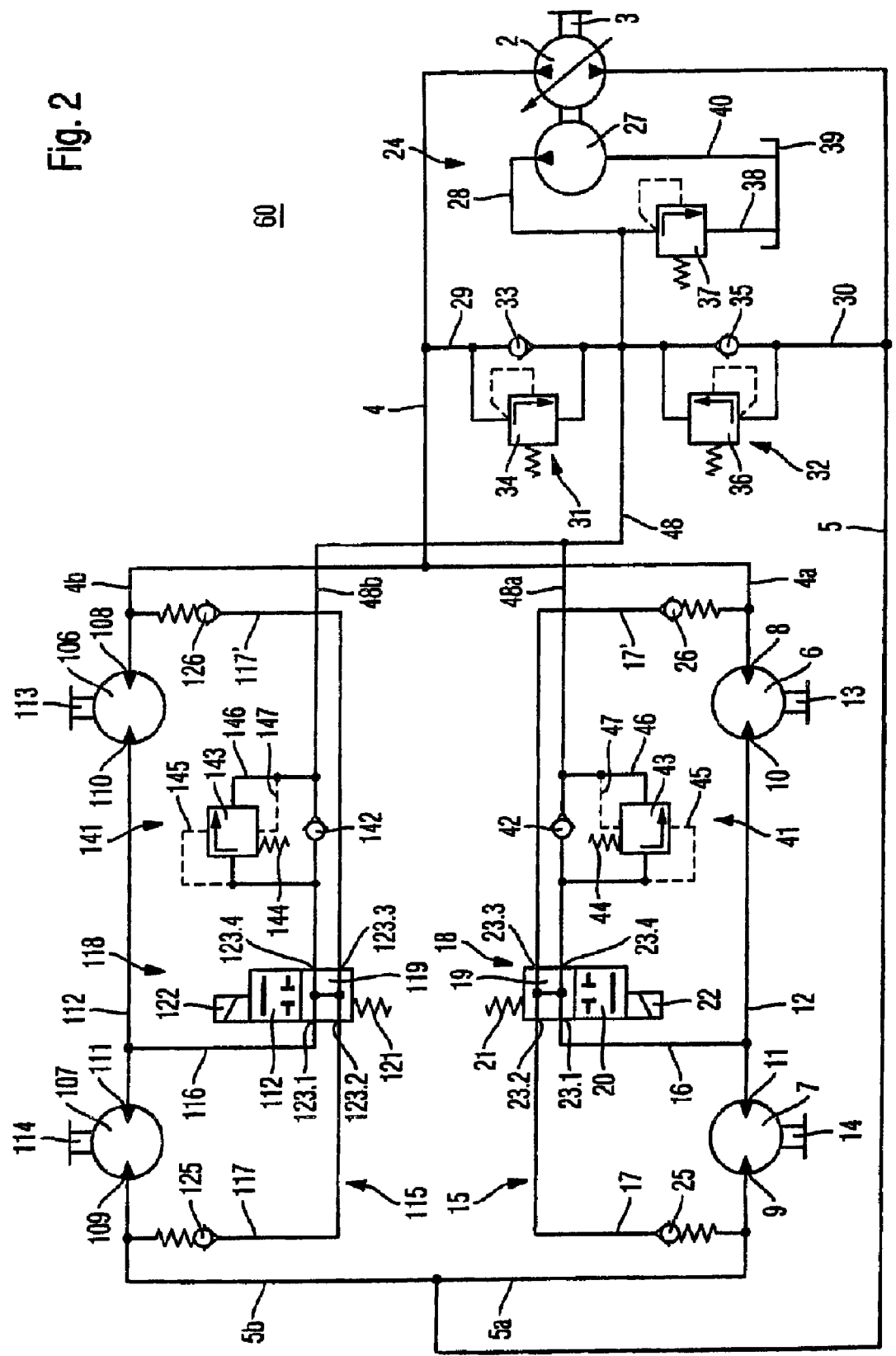
FIG. 2 shows a second exemplary embodiment of a hydrostatic multi-motor drive according to the invention having two hydraulic motor pairs.

Illustrated in FIG. 2 is a further preferred exemplary embodiment of a hydrostatic multi-motor drive according to the invention. In addition to the first hydraulic motor 6 and the second hydraulic motor 7 of the first hydraulic motor pair, a second hydraulic motor pair is provided. The elements which have already been explained in relation to a single hydraulic motor pair and appear again in the same manner in the second hydraulic motor pair are denoted, for the sake of simplicity, by reference symbols increased by 100.

The second hydraulic motor pair therefore comprises a first hydraulic motor 106 and a second hydraulic motor 107. The first hydraulic motor 106 has a first connection 108 and a second connection 110. The second hydraulic motor 107 of the second hydraulic motor pair 107 has a first connection 109 and a second connection 111. The two connections 110 and 111 of the first hydraulic motor 106 and of the second hydraulic motor of the second hydraulic motor pair are connected to one another via a second working line section 112. The first and the second hydraulic motor pair are connected in parallel to the first working line 4 and to the second working line 5. For this purpose, the first working line 4 divides into a first working line branch 4a and a second working line branch 4b. Correspondingly, the second working line 5 also branches into a third working line branch 5 and a fourth working line branch 5b.

Via the first working line branch 4a and the second working line branch 4b, the respectively first connections 8, 108 of the first hydraulic motors 6, 106 of the first and second hydraulic motor pair, respectively, are connected to the first working line 4. Correspondingly, via the third working line branch 5 and the fourth working line branch 5b, the first connections 9, 109 of the second hydraulic motors 7, 107 of the first and second hydraulic motor pair, respectively, are connected to the second working line 5. In order to enable a clear assignment of the second and third sections 17, 17' of the first bypass line 15 to the first hydraulic motor pair, the second section 17 leads into the third working line branch 5a. Correspondingly, the third section 17' leads into the second working line branch 4a.

The second hydraulic motor pair with the hydraulic motors 106, 107 has a second bypass line 115, in which a second switching valve 118 is arranged. The function and connection of the second switching valve 118 and of the second bypass line 115 correspond to the first bypass line 15 and the first switching valve 18, so that a repeated description is dispensed with. The respectively fourth connection 23.4 and 123.4 of the first switching valve 18 and of the second switching valve 118 are connected, via a first connecting line branch 48a and a second connecting line branch 48b respectively, to the connecting line 48 and via the latter to the feed device 24.

Figure 3:
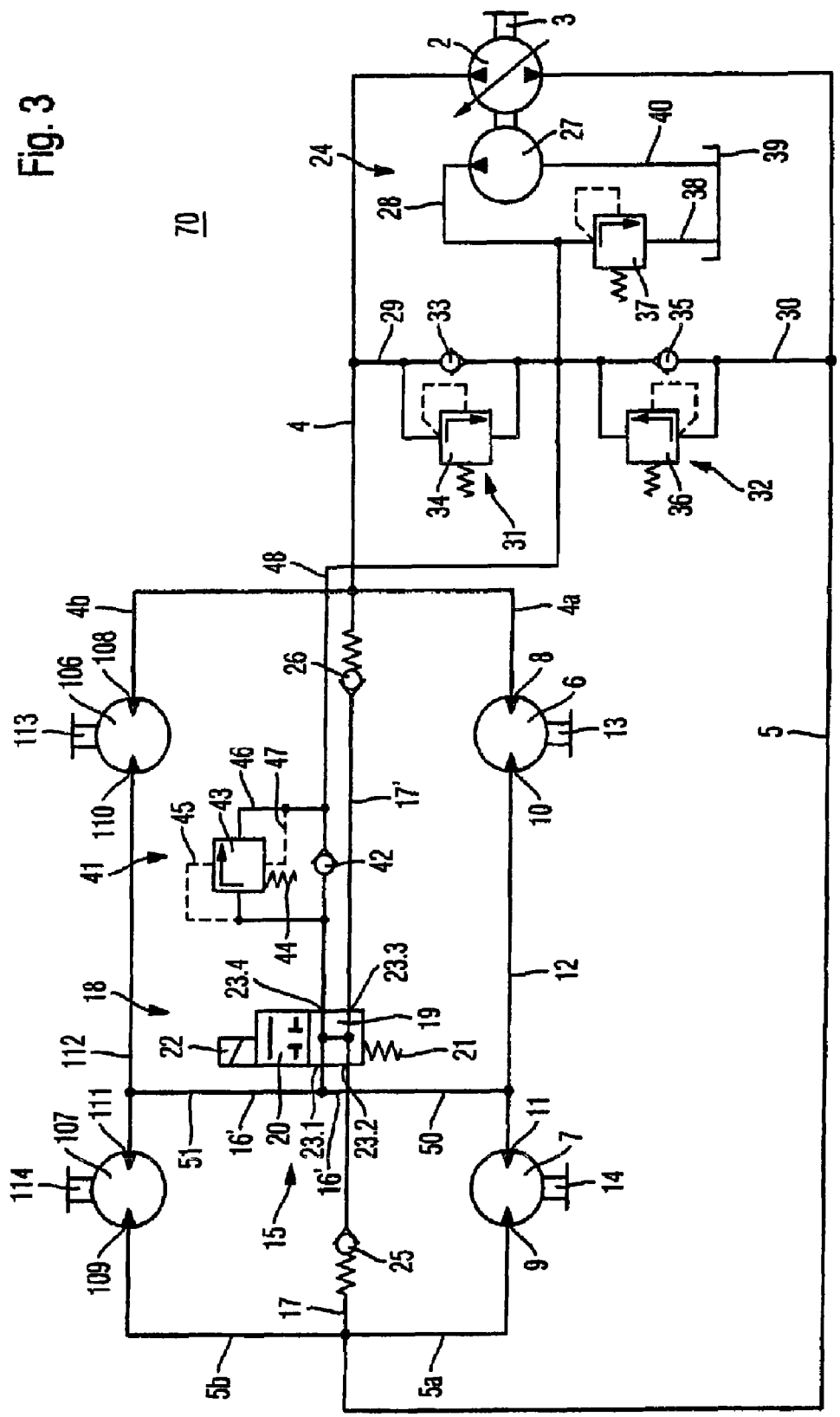
FIG. 3 shows a third exemplary embodiment of a hydrostatic multi-motor drive according to the invention having two hydraulic motor pairs.

Illustrated in FIG. 3 is a further preferred exemplary embodiment with two hydraulic motor pairs. In contrast to the exemplary embodiment of FIG. 2, however, a first bypass line 15 and a second bypass line 115, each of which is assigned to a hydraulic motor pair, is not provided. Rather, a common first switching valve 15 is provided. In order to enable a bypass of the downstream hydraulic motor of the second hydraulic motor pair as well, the first section 16' of the bypass line 15' comprises a first bypass line branch 50 and a second bypass line branch 51. The two bypass line branches 50, 51 lead together to the second connection 23.2 of the first switching valve 18.

The elements which have already been described in relation to the preceding exemplary embodiments are denoted by the same reference symbols. Renewed description is therefore dispensed with.

Figure 4:
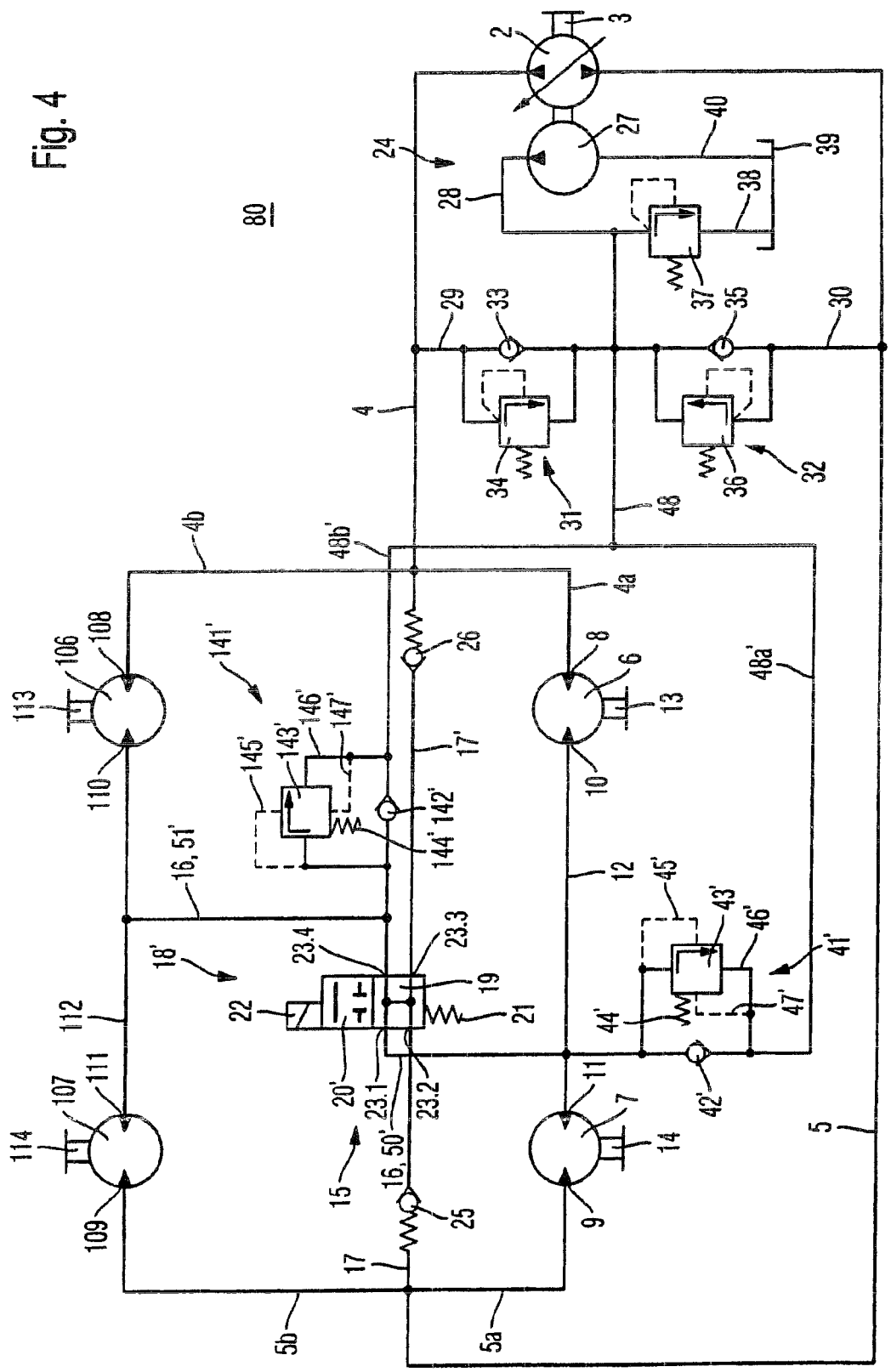
FIG. 4 shows a fourth exemplary embodiment of a hydrostatic multi-motor drive according to the invention having two hydraulic motor pairs.

Illustrated in FIG. 4 is a fourth exemplary embodiment of a hydrostatic multi-motor drive according to the invention. The exemplary embodiment of FIG. 4 proceeds from the exemplary embodiment of FIG. 3. Only the changes compared with the exemplary embodiment of FIG. 3 are therefore explained below.

As already in the third exemplary embodiment, a common first switching valve 18' is provided for both hydraulic motor pairs. However, the common first switching valve 18' in its second switching position 20' disconnects all four connections 23.1-23.4 from one another.

The first section 16' of the first bypass line 15' again comprises a first bypass line branch 50' and a second bypass line branch 51'. In contrast to the exemplary embodiment of FIG. 3, however, the first bypass line branch 50' is connected to the second connection 23.2 of the first switching valve 18'. The first bypass line branch 50' thus connects the first working line section 12 to the first switching valve 18'.

The second bypass line branch 51', in contrast, connects the second working line section 112 to the third connection 23.3 of the first switching valve 18'.

Furthermore, a third feed valve unit 41' is provided. The third feed valve unit 41' is arranged in a first connecting line branch 48a', which connects the connecting line 48 directly to the first working line section 12. Furthermore, a fourth feed valve unit 141', which is arranged in a second connecting line branch 48b', is provided. The second connecting line branch 48b' correspondingly connects the connecting line 48 directly to the second working line section 112. For this purpose, in the fourth exemplary embodiment illustrated, the second connecting line branch 48b' leads into the second bypass line 51'.

Figure 5:
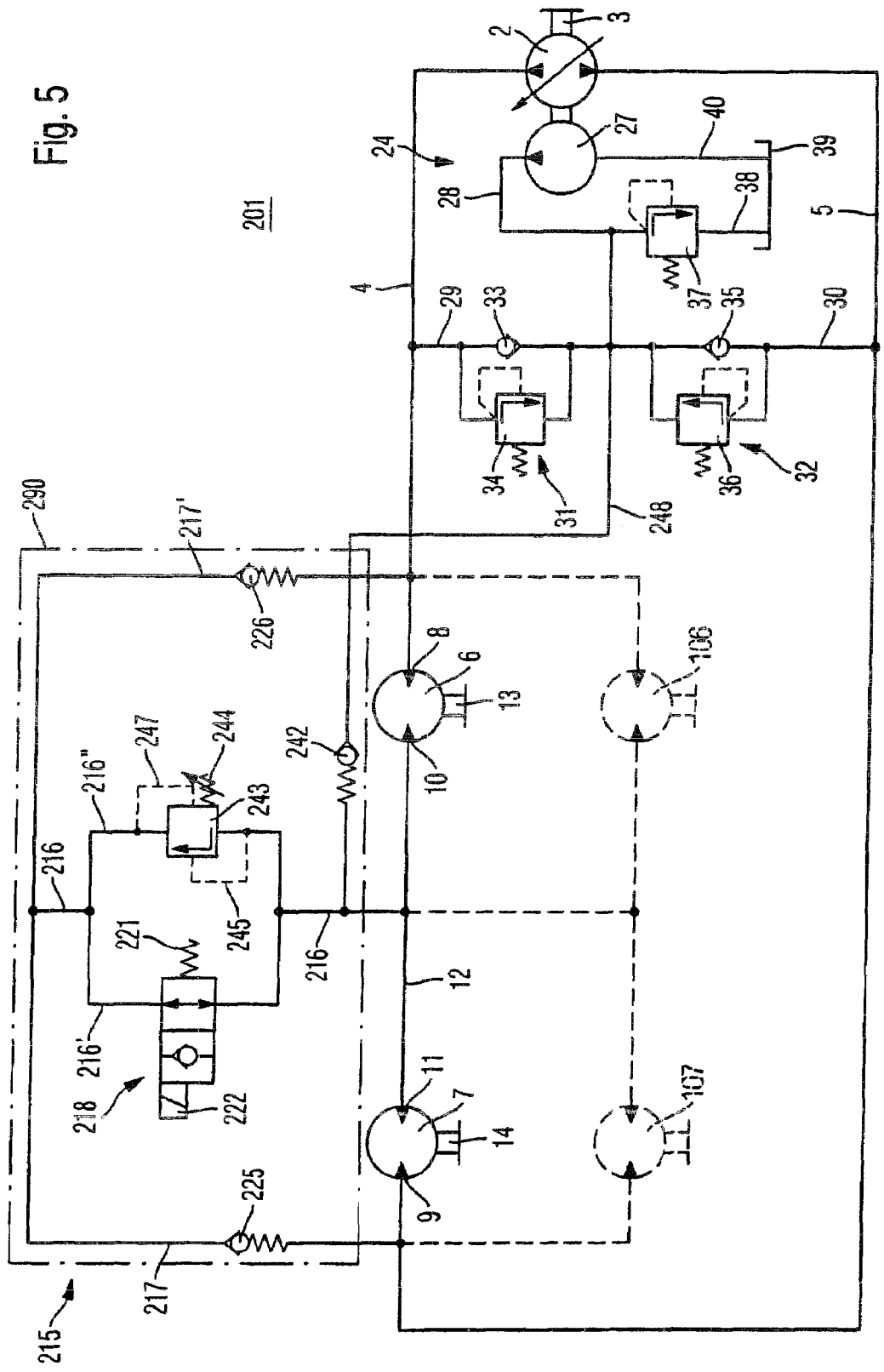
FIG. 5 shows a fifth exemplary embodiment of a hydrostatic multi-motor drive according to the invention having a simplified construction.

Shown in FIG. 5 is a further exemplary embodiment of a multi-motor drive according to the invention. The multi-motor drive 201 shown there is based fundamentally on that which is illustrated in FIG. 1 and has been explained in detail. However, the components required here for maintaining a minimum pressure at the respectively downstream motor are combined in a functional block 290. The functional block 290 comprises a modified design of the first switching valve 218. In order to be able to understand the functions more easily, in each case mutually corresponding features are provided with reference symbols increased by 200.

In contrast to FIG. 1, the second section 217 and the third section 217' are joined outside the first switching valve 218. At this junction point, the first section 216 branches off and thus connects the second and third section 217, 217' to the first working line section 12. The first section 216 in the course of this branches into a first line branch 216' and a second line branch 216". The first switching valve 218 is arranged in the first line branch 216'. In its starting position illustrated, in which it is maintained by the valve spring 221, the first switching valve 218 connects the second section 217 and at the same time the third section 217' to the first working line section 12 via the first section 216. In contrast, if the first switching valve 218 is moved to its second switching position by the electromagnet 222, an outflow of pressure medium from the first working line section is prevented by a nonreturn valve function in the second position of the first switching valve 218 and thus the surrounding line 215, which also comprises the first section 216, is interrupted.

Arranged in the second line branch 216" is the differential pressure regulating valve 243. The differential pressure regulating valve 243 corresponds in its construction and function essentially to the differential pressure regulating valve 43 which has already been explained with reference to FIG. 1. To avoid unnecessary repetitions, renewed description is therefore dispensed with below. In its part formed between the first switching valve 218 and the differential pressure regulating valve 243 and the first working line section 12, the first section 216 is connected, via the connecting line 248, to the feed device 24. The nonreturn valve 242, which here on its own forms the third feed valve unit, is now additionally arranged in the connecting line 248.

Owing to the arrangement of the modified first switching valve 218 in parallel with the differential pressure regulating valve 243, it is possible to use a simplified first switching valve 218. The design of the first switching valve 218 is simplified compared with the 4/2-way valve of FIG. 1. This simplification is achieved by the arrangement of the differential pressure regulating valve 243 in parallel for protection against pressure.

The functional block 290 may be integrated as an assembly in the hydrostatic multi-motor drive 201 according to the invention. As a result, it is possible in particular to carry out an extension to more than the two hydraulic motors 6, 7 illustrated. Thus, dashed lines in FIG. 5 show that a further first hydraulic motor 106 and a further second hydraulic motor 107 are arranged in parallel with the first hydraulic motor 6 and the second hydraulic motor 7, respectively. The functional block 290 is in this case connected to both hydraulic motor pairs.

Figure 6:
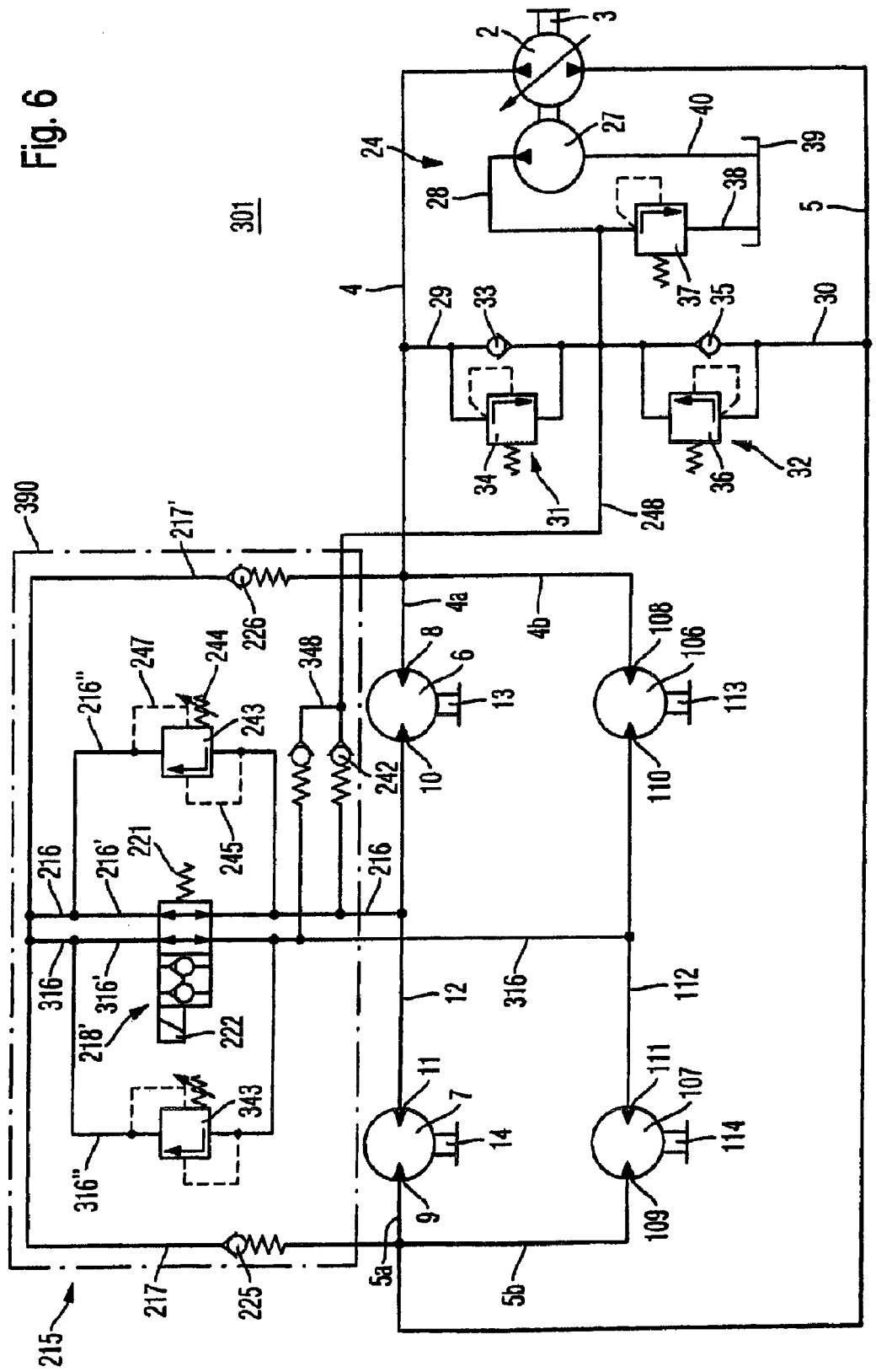
FIG. 6 shows a further exemplary embodiment of the simplified multi-motor drive.

Illustrated in FIG. 6 is a modified exemplary embodiment of the multi-motor drive of FIG. 5. Here, too, a total of four hydraulic motors 6, 7, 106 and 107 are provided, the first hydraulic motor 6 and the second hydraulic motor 7 forming a first hydraulic motor pair and the further first hydraulic motor 106 and the further second hydraulic motor 107 forming a second hydraulic motor pair. The modified functional block 390 has a modified first switching valve 218' in which two parallel paths are formed in the rest position. In this case, in the rest position of the modified switching valve 218', a first path connects the second and third section 217, 217' to the first working line section 12. In parallel with this, the differential pressure regulating valve 243 is provided in the second line branch 216', as has already been explained for FIG. 5. The arrangement in relation to the first hydraulic motor 6 and the second hydraulic motor 7 of the first hydraulic motor pair therefore corresponds completely to that already shown in FIG. 5.

However, owing to the further path through the modified switching valve 218', it is possible to uncouple the first hydraulic motor 106 and the second hydraulic motor 107 of the second hydraulic motor pair from the first hydraulic motor 6 and the second hydraulic motor 7 via the second path of the modified first switching valve 218.

Accordingly, a further first section 316, which connects the second and third section 217, 217' to the second working line section 112 via the second path through the modified first switching valve 218', is provided. The modified first switching valve 218' is therefore arranged in the respectively first line branch 216' and 316' of the first section 216 and of the second section 316, respectively. In order to enable protection against pressure also in relation to the second hydraulic motor pair 106, 107, a further differential pressure regulating valve 343 is arranged in a second line section 316" of the first section 316, in parallel with the second path of the modified switching valve 218'. With regard to the function, the differential pressure regulating valve 343 corresponds to the differential pressure regulating valve 243.

In the second switching position of the modified first switching valve 218', nonreturn valve functions are formed for each of the two paths. In the exemplary embodiment according to FIG. 6, the surrounding line comprises the two parallel first sections 216 and 316.

In addition, a connecting line branch 348, which leads into that part of the first section 316 formed between the modified first switching valve 218' and the second working line section 112, branches off from the connecting line 248. A further feed valve 342, which opens in the direction of the first section 316 like the feed valve 242, is arranged in the connecting line branch 348'.

Otherwise, the function of the individual elements corresponds to those already explained with reference to FIG. 1-FIG. 3. Moreover, the invention is not limited to the exemplary embodiments illustrated. In particular, it is possible advantageously to combine individual features of the individual exemplary embodiments with one another.

The invention claimed is:

1. A hydrostatic multi-motor drive having a hydraulic pump and at least one first hydraulic motor pair, the two hydraulic motors of the first hydraulic motor pair being connected to one another in series via a first working line section, and there being provided a first bypass line, which connects an upstream connection of the hydraulic motor, downstream in relation to a volume flow produced by the hydraulic pump, to a downstream connection of the downstream hydraulic motor, a first valve unit, which interrupts the first bypass line, being arranged in the bypass line, wherein a first minimum-pressure maintaining device for maintaining a minimum pressure at the upstream connection of the downstream hydraulic motor is arranged in the first bypass line.

2. The hydrostatic multi-motor drive according to claim 1, wherein the first minimum-pressure maintaining device comprises at least one spring-loaded nonreturn valve.

3. The hydrostatic multi-motor drive according to claim 1, wherein the first bypass line comprises at least a first section, which connects the first working line section to the first valve unit, and comprises a second section, which connects the first valve unit to a downstream working line, and comprises a third section, which connects the first valve unit to an upstream working line.

4. The hydrostatic multi-motor drive according to claim 3, wherein the first minimum-pressure maintaining device comprises in each case one spring-loaded nonreturn valve in the second section and in the third section of the first bypass line.

5. The hydrostatic multi-motor drive according to claim 1, wherein the hydrostatic drive has a second hydraulic motor pair, the two hydraulic motors of which are connected to one another in series via a second working line section, a second bypass line, which has a second valve unit and at least one second minimum-pressure maintaining device, being assigned to the downstream hydraulic motor of the second hydraulic motor pair.

6. The hydrostatic multi-motor drive according to claim 5, wherein the first and the second bypass line and/or the first and the second minimum-maintaining pressure device are identically constructed.

7. The hydrostatic multi-motor drive according to claim 1, wherein the hydrostatic multi-motor drive has a second hydraulic motor pair, the two hydraulic motors of which are connected to one another in series via a second working line section, the first bypass line connecting the respectively upstream connections of the downstream hydraulic motors of both hydraulic motor pairs to the downstream connections of the downstream hydraulic motors of both hydraulic motor pairs.

8. The hydrostatic multi-motor drive according to claim 7, wherein the first bypass line comprises at least a first section having a first bypass line branch, which connects the first working line section to the first valve unit, and comprises a second bypass line branch, which connects the second working line section to the first valve unit, and comprises a second section, which connects the first valve unit to a downstream working line, and comprises a third section, which connects the first valve unit to an upstream working line.

9. The hydrostatic multi-motor drive according to claim 8, wherein the first bypass line branch and the second bypass line branch lead together to a connection of the first valve unit.

10. The hydrostatic multi-motor drive according to claim 8, wherein the first bypass line branch and the second bypass line branch lead to two different connections of the first valve unit, and the different connections are disconnected from one another in one switching position of the first valve unit.

11. The hydrostatic multi-motor drive according to claim 8, wherein the first working line section and the second working line section are connected to the feed device via in each case a separate feed valve unit.

12. The hydrostatic multi-motor drive according to claim 8, wherein the minimum-pressure maintaining device comprises in each case one spring-loaded nonreturn valve in the second section and in the third section of the bypass line.

13. The hydrostatic multi-motor drive according to claim 1, wherein the first and/or second valve unit is embodied as a switching valve and in one switching position of the switching valve the working line section connecting the two hydraulic motors to one another is connected to a feed device.

14. The hydrostatic multi-motor drive according to claim 1, wherein a feed valve unit is connected to the first and/or to the second working line section via the valve unit.

* * * * *